United States Patent Office

3,573,036
METHOD FOR PRODUCING STOICHIOMETRIC URANIUM DIOXIDE COMPOSITIONS
Norman P. Fairbanks and James A. McGurty, Cincinnati, Ohio, assignors to the United States of America as represented by the United States Atomic Energy Commission
No Drawing. Filed Nov. 15, 1966, Ser. No. 594,636
Int. Cl. C22b 61/04; C22c 1/04
U.S. Cl. 75—206      2 Claims

ABSTRACT OF THE DISCLOSURE

This invention relates to a method of fabricating a nuclear fuel element which comprises forming a body of uranium dioxide in a matrix selected from refractory metal or refractory metal alloy, sintering said body in a non-oxidizing atmosphere to a desired density at a temperature above 1700° C., thereby producing hypostoichiometric urania, and contacting the resulting cermet with wet hydrogen at a temperature in the range 1000° C.–1500° C. until substantial stoichiometry has been attained.

---

The invention described herein was made in the course of, or under, a contract with the United States Atomic Energy Commission.

The present invention relates to a method for restoring the stoichiometry of a $UO_2$-containing cermet nuclear fuel composition comprised of a sintered compact of uranium dioxide existing in solution or as a dispersed phase in a refractory metal matrix such as tungsten, molybdenum, niobium, tantalum, or alloys thereof.

Since the first bulk use of uranium dioxide in a power reactor, the production and use of $UO_2$ as a nuclear fuel composition has continued to expand. As more experience has been gained, it has been found that certain limitations resulting from the loss of stability of $UO_2$ as a compound at high temperatures in the region 1000° C.–2000° C. have restricted its full development as a nuclear fuel. This limitation is particularly evident in cermet-type $UO_2$ fuel compositions where the finding has been that maximum fuel stability is a direct function of $UO_2$ stoichiometry.

Uranium dioxide stoichiometry cannot be maintained during the process of fabricating densified cermet compositions because the fabrication parameters required for maximum density are inconsistent with the conditions which lead to $UO_2$ stoichiometry. In order to obtain maximum uranium density in such compositions containing uranium dioxide as a dispersion in a refractory metal or alloy matrix, the cermet must be sintered in an inert, i.e., non-oxidizing atmosphere at temperatures at least above 1700° C. An oxidizing atmosphere which will result in the conversion of $UO_2$ to $U_3O_8$ must be avoided since it will result in volume expansion of about 50%, thus destroying the fuel as well as the compact. On the other hand, sintering in a non-oxidizing atmosphere above 1700° C. results in volatilization of the $UO_2$ non-congruently and sub-stoichiometric $UO_{2-x}$ compositions are produced from which elemental liquid uranium precipitates upon cooling to lower temperatures. The higher the temperature the greater the stability of the $UO_{2-x}$ phase. At 2450° C. single phase $UO_{2-x}$ compositions are stable in which $x$ is greater than 0.35. As the temperature drops the value of $x$ rapidly decreases and approaches zero at the melting point of uranium metal. On cooling a $UO_{2-x}$ composition from a high temperature at which it is stable to lower temperatures, a decomposition of $UO_{2-x}$ into $UO_{2-x}$, and liquid uranium metal occurs. For every incremental decrease in temperature, the value of $x$ decreases and more liquid uranium precipitates. The greater the initial value of $x$ the higher the temperature at which liquid uranium metal will first precipitate, and the more liquid uranium in the structure at the temperature of complete precipitation of liquid uranium (1300° C.). This elemental liquid uranium is detrimental because of its mobility or solubility in a metal matrix and subsequent penetration and reaction with the matrix or cladding. More particularly, the presence of free uranium is undesirable because it can cause degradation of the matrix upon repeated thermal cycling; form solid solutions with matrix materials to form, in turn, low-melting, eutectic compositions with inferior qualities; and may diffuse into cladding materials and eventually lead to rupture of the cladding. Any of these results may apply to a particular $UO_2$-containing fuel system to lower its temperature capability and/or shorten its operating life. To alleviate or eliminate these problems, a means is needed, and it is an object of this invention to provide a method which ensures formation and stabilization of stoichiometric $UO_2$ in $UO_2$-containing compositions, particularly cermet compositions in which the $UO_2$ exists as a dispersed phase in a refractory metal or alloy matrix.

The problem which this invention seeks to cure or ameliorate results from the conflicting requirements of usefully high compact densities and the concomitant requirement of $UO_2$ stoichiometry. Our experience has shown that sintering conditions which produce a usefully high (i.e., at least 92% theoretical) density such as sintering in dry $H_2$ are inevitably accompanied by the formation of an undesirable hypo-stoichiometric urania which will decompose on cooling to lower temperatures to form liquid uranium.

In describing this invention, reference will be made to dry and wet hydrogen. As used herein, dry hydrogen is defined to mean hydrogen which contains insufficient water vapor to significantly affect the strongly reducing properties of hydrogen. For the purposes of characterizing and distinguishing the effective stoichiometry-restoring reagent of this invention, dry hydrogen is hydrogen which contains less than 5 p.p.m. of water vapor based on the weight of the gas whereas wet hydrogen is defined to mean hydrogen containing sufficient water vapor as to oxidize $UO_{2-x}$ to $UO_2$ or uranium metal to $UO_2$ at a given temperature. In general, hydrogen containing at least 1000 p.p.m. of water vapor will be referred to as wet hydrogen. For the purposes of sintering a $UO_2$-containing compact to a desirably high density, i.e., at least 92% theoretical density, dry or wet hydrogen as well as other inert gases, such as helium, argon, neon, or krypton, singly, or in combination, may be used. They are equivalent in the sense that they are non-oxidizing gases at sintering temperatures of the order of 2000° C. and above. The highest densities are obtained by sintering in dry hydrogen and this is the preferred atmosphere for densification of the pressed compact. Sintering in wet hydrogen produces structures of somewhat lower densities. The sintering temperature required for achieving usefully high density will depend upon the matrix material. In general, the higher the sintering temperature, the higher will be the final attained density up to 2500° C. Temperatures above 2500° C. should be avoided because the volatilization rate of $UO_2$ then becomes excessive.

When the compact or cermet contains tungsten, sintering in wet hydrogen above 2200° C. should be avoided because of the so-called tungsten transport phenomenon. At temperatures above 2200° C. the tungsten migrates at a rapid rate from hot to slightly cooler surfaces. Because of this dimensional tolerance and product uniformity are difficult to maintain. This property is characteristic of tungsten only. Cermets or compacts containing molybdenum, niobium, or tantalum may be safely sintered in wet hydrogen above 2200° C. in order to attain higher density.

Keeping these definitions in mind, it should also be made clear that the method of this invention to produce dense substantially stoichiometric $UO_2$-containing compacts or cermets restores or rectifies the stoichiometry rather than prevents the formation of sub-stoichiometric urania where urania refers to a stoichiometric urania as well as to nonstoichiometric uranium dioxide.

The present invention is based on the discovery that sub-stoichiometric urania and its degradation product, liquid uranium, can be converted to a substantially stoichiometric urania by reaction with wet hydrogen as previously defined at a temperature in the range 1000° C.–2000° C. and preferably in the range 1300° C.–1500° C. The definition and condition of substantially stoichiometric urania can be tested by reacting the urania-containing compact (which has been exposed to wet hydrogen at a temperature in the range 1300° C.–1500° C.) with hydrogen gas at a temperature in the range 350° C.–400° C. Any reaction which occurs will be represented by the equation $U+3H_2 \rightarrow UH_3$. Since the density of uranium metal is 18.7 grams/cc. vs. 10.9 grams/cc. for uranium hydride, the hydriding reaction represents approximately 80% increase in volume of the fuel phase so that the result of this reaction, if it occurs in specimens containing even minor amounts of uranium metal, will result in disintegration of the compact. The absence of this reaction will indicate the presence of a substantially stoichiometric condition. Electron microprobe analysis can also be used to detect the presence of metallic uranium.

Restoration of substantial stoichiometry after sintering the compact or cermet to a desired density can be effected in one of three ways.

(1) A first procedure involves cooling the compact or cermet from the sintering temperature in an inert (non-hydrogen-containing) atmosphere to room temperature in the case where intermediate operations such as machining or cladding are desired. After the machining and cleaning operations the fuel element is then reheated and reacted with a wet hydrogen atmosphere at a temperature in the preferred range of 1300° C.–1500° C. until substantial stoichiometry is reached.

(2) If intermediate operations are not desired the sintered compact is cooled rapidly at a rate in the range of 50° C.–100° C. per minute in an inert atmosphere to a temperature in the range of 1000° C.–1400° C. and then reacted with wet hydrogen at said temperature for a time sufficient to restore substantial stoichiometry. In either variation, the substoichiometric urania and a free uranium which has formed will be converted under wet hydrogen treatment to a substantially stoichiometric condition.

(3) A third procedure is required where elemental urania can form a solid solution with matrix materials. For example, uranium is known to alloy with such matrix materials as rhenium, molybdenum, niobium, and iron. In such cases, the prescribed procedure involves slow cooling from the sintering temperature at a rate of 50–100° C. per hour in a wet hydrogen atmosphere to a temperature in the range 1000° C.–1400° C. and then holding at temperature for as long as necessary to complete restoration to substantial stoichiometry.

The oxidation of hypo-stoichiometric urania and elemental uranium by wet hydrogen is such that it cannot always be precisely controlled to produce substantially stoichiometric uranium dioxide, but passes beyond stoichiometry to a slightly hyper-stoichiometric state. A hyperstoichiometric state is undesirable because when the cermet or compact is clad and heated, excess oxygen may be released causing internal pressure and possible rupture of the clad. In such cases, complete restoration to the substantial $UO_{2.00}$ stoichiometry is effected by a subsequent treatment in dry hydrogen at a temperature in the range 1100° C.–1300° C.

The effectiveness of the post-sintering dual wet-dry hydrogen treatment to attain or restore the desired $UO_{2.00}$ stoichiometry will now be demonstrated in the following examples which represent specific embodiments of our invention. All $UO_2$ in starting mixtures was stoichiometric or hyper-stoichiometric.

EXAMPLE I

This example is designed to illustrate the effectiveness of a wet hydrogen treatment in restoring the uranium dioxide stoichiometry in typical uranium dioxide cermet compositions in which $UO_2$ exists as a dispersed phase in a refractory metal matrix.

Powder compacts of (1) tungsten metal; (2) uranium dioxide, $UO_2$; (3) $UO_2$-containing 10 wt. percent thoria, $ThO_2$; and (4) a cermet composition containing a tungsten matrix and a dispersed phase consisting of 54 volume percent of $UO_2$ and 6 volume percent thoria were sintered for 2 hours at 2200° C. in dry hydrogen and then cooled to room temperature in argon. Chemical analyses were performed to determine oxygen-to-uranium ratios of the $UO_2$ specimens and the oxygen content of the tungsten specimens for use as a control or comparison basis. All specimens were then machined to standard sizes to fit tubing used for cladding, and then cleaned in water and dried in vacuum. The specimens of each type were then treated for 18 hours at a temperature in the range of 1300° C.–1500° C. in wet hydrogen having a dewpoint of 0° C. equivalent to a water vapor content of 6000 parts per million and then at 1400° C. for 18 hours in dry hydrogen. Chemical analyses were performed after this dual treatment. The results are summarized in Table I below.

TABLE I.—CHEMICAL ANALYSES AND DIMENSIONAL CHANGES RESULTING FROM TREATMENT OF SINTERED FUEL ELEMENT CORE COMPACTS IN WET AND DRY HYDROGEN AT 1,400°C.

|  | 100% tungsten | | 100% $UO_2$ | | 90$UO_2$-10$ThO_2$ | | 54W-(4.6$ThO_2$-41.4$UO_2$) | |
|---|---|---|---|---|---|---|---|---|
| Machine diameter, inches | 1.000 | 0.458 | 1.000 | 0.458 | 1.000 | 0.458 | 1.000 | 0.458 |
| Machined density, percent of T.D. | 94.8 | 94.2 | 94.6 | 94.6 | 92.9 | 91.8 | 92.8 | 91.0 |
| As sintered in dry $H_2$ oxygen, p.p.m. | 4 | 6 | | | | | | |
| P.p.m. free U, wt. percent | | | 0.31 | 0.68 | 0.15 | 0.27 | 0.17 | 0.14 |
| Oxygen content in p.p.m. after wet and dry hydrogen treatment | 5.5 | 7.1 | | | | | | |
| O/U ratio | | | 2.002 | 2.002 | | | | |
| Free U, wt. percent | | | (1) | (1) | (1) | (1) | (1) | (1) |
| Total diameter change, inch | Nil | Nil | +0.002 | Nil | Nil | +0.003 | +0.001 | |

[1] None detected, within limits of hydriding method sensitive to within (0.01% U).

It will be noted that the oxygen content of the tungsten control specimens did not vary appreciably from the original parts per million indicating that the wet specimens were very near the desired stoichiometric composition. Furthermore, dimensional changes in the cermet were very slight indicating no detrimental physical distortions; and most importantly, no free uranium within the sensitive limits of detection analysis was noted in any of the $UO_2$-containing compositions.

EXAMPLE II

This example serves to demonstrate the improved dimensional stability of nuclear fuel compositions containing stoichiometric $UO_2$ obtained by the restorative wet-dry hydrogen process sequence of this invention.

Two groups of W–$UO_2$ compacts were prepared by two different procedures (A and B) as follows:

(A) Sintered for 2 hours at 2200° C. in dry hydrogen, cooled to 1400° C. in a dry $H_2$ atmosphere; at 1400° C.

treated with wet hydrogen for 18 hours, followed by a 1400° C. treatment in dry $H_2$ for 18 hours.

(B) Sintered for 2 hours at 2200° C. in dry hydrogen, cooled to 1400° C. in a dry $H_2$ atmosphere; switched to helium, and then cooled to room temperature.

Specimens prepared by procedure A had no detectable uranium while specimens prepared by procedure B contained an average of 0.17% free uranium. All specimens were clad with a W–30–Mo–30–Re alloy prepared by roll forming and welding the alloy sheet, and autoclaving to the W–$UO_2$ at 1750° C. to effect a metallurgical bond. The clad specimens were then thermally cycled to 2150° C. using an exponential cooling rate (280° C./min. initially). After 100 cycles, the specimens processed by schedule B developed large cracks in the cladding, sustained bond failure, and bulged. Metallographic examination revealed that uranium metal had penetrated deeply into the grain boundaries of the tungsten matrix. On the other hand, the specimens processed according to schedule A were leak-free and showed no evidence of cladding imperfections or bond defects between cladding and core even after 100 thermal cycles.

EXAMPLE III

Fuel cores were prepared with matrices of W–30Re, W–25Re–30Mo using the following procedures: (1) blend agglomerated $UO_2$ (−100/+200 mesh) with previously blended matrix powders; (2) cold press and sinter for 2 hours in dry hydrogen at 2200° C.; (3) cool rapidly to 2000° C., change to wet hydrogen and hold for 1 hour, cool to 1200° C. in wet $H_2$ and then cool in argon to room temperature; (4) machine to a diameter of 1.2 cm. and a length of 3.8 cm., clean ultrasonically in water; (5) treat in dry hydrogen for 4 hours and in vacuum for one-half hour at 1200° C.; (6) encapsulate in W–30Re–30Mo cladding and electron beam weld; (7) gas pressure bond at 1750° C. for 3 hours under a pressure of 700 kg./m². Specimens prepared using this procedure were stoichiometric within the limits of the previously mentioned hydriding analytical technique.

EXAMPLE IV

Over 500,000 hours of testing of refractory metal clad, refractory metal $UO_2$ fuel elements work were carried out in the temperature range 1600° C.–2200° C. for periods up to 10,000 hours. The data obtained from these experiments clearly demonstrated the stability of stoichiometric $UO_2$ in contact with the refractory metals and their alloys. From this work it was determined that if the fuel existed in the hypostoichiometric form, blistering was encountered within the first 100 hours of operation. In the case of hypo-stoichiometric fuel composition depending on the degree of oxygen deficiency failure would occur in a matter of a few hours. Failures in these cases took the form of penetrations of the claddings by the fuel leading to mechanical failure of the cladding and exposure of the fuel to the external environment and a failure of the metallurgical bond at the core-clad interface.

The importance of obtaining stoichiometric fuel was demonstrated using specimens consisting of $UO_2$ dispersed in a matrix of tungsten, and clad with a W-Mo-Re alloy. Prior to the development of the herein disclosed procedures for obtaining substantial stoichiometry, 60 specimens were prepared by sintering in dry hydrogen to 2200° C., followed by cooling in helium to room temperature. All of these specimens failed as a result of interface separation between the cermet and cladding and cracking of the cladding due to uranium metal grain boundary penetration. Subsequently using the third process variation method previously described for controlling stoichiometry, over 60 specimens were prepared by heating in dry hydrogen to 2200° C., changing to wet hydrogen at the conclusion of the sintering period and then slow cooling in the wet hydrogen to 1400° C. The specimens were further held at 1400° C. for a period in excess of 10 hours in wet hydrogen and then subjected to dry hydrogen treatment for in excess of 10 hours. These specimens were tested at temperatures ranging from 1600° C.–2500° C. for periods at the lower temperatures to in excess of 3000 hours. Specimens of this groups have also been fast thermal cycled from room temperature to 1600° C. and 1800° C. for up to 45 thermal cycles. The value of wet-dry hydrogen treatment was conclusively demonstrated by these experiments in that no specimen failure as indicated by leakage of fuel through the cladding was found for any of these specimens as compared to the previously cited 100% failure of specimens which were tested under similar conditions but which were not subject to the $UO_2$ stoichiometric control described herein.

With these conditions in mind, any combination of the following cermet compositions and, cladding can be combined with advantage to fabricate a thermally and dimensionally stable dispersion clad fuel element in which substantial $UO_2$ stoichiometry is achieved in accordance with the process hereinbefore disclosed.

| | Cermet Composition | |
|---|---|---|
| Clad | Matrix | Dispersed or Solute Phase |
| W–25–30Re–30Mo | W | $UO_2$. |
| Ta | Mo | $UO_2$+$ThO_2$ mixture. |
| Nb | W25–30Re | |
| Mo | W–25Re | |
| W–25–30Re | W–25–30Re–30Mo | |
| Ta 8W 2Hf | | |
| TaW | | |
| Mo 0.5Ta 0.1Zr | | |

All alloy concentrations are stated in weight percent, in the specification and claims.

We claim:
1. A method of fabricating a nuclear fuel element which comprises forming a body of uranium dioxide in a matrix selected from a refractory metal or refractory metal alloy, sintering said body in a non-oxidizing atmosphere to a desired density at a temperature above 1700° C., thereby producing hypostoichiometric urania, and contacting the resulting cermet with wet hydrogen at a temperature in the range 1000° C.–1500° C. until substantial stoichiometry has been attained.

2. The method according to claim 1 wherein the temperature range is 1300° C.–1500° C.

References Cited

UNITED STATES PATENTS

| 3,087,781 | 4/1963 | Levey et al. | 264—0.5X |
| 3,087,876 | 4/1963 | Henderson et al. | 264—0.5 |
| 3,140,151 | 7/1964 | Foltz et al. | 23—355 |
| 3,189,666 | 6/1965 | Levey, Jr., et al. | 264—0.5 |
| 3,192,010 | 6/1965 | Lloyd et al. | 23—355 |
| 3,194,852 | 7/1965 | Lloyd et al. | 23—355X |
| 3,235,327 | 2/1966 | Blundell et al. | 23—355 |
| 3,258,317 | 6/1966 | Brearton | 23—355 |
| 3,271,142 | 9/1966 | Hammond et al. | 252—30.1X |
| 3,276,867 | 10/1966 | Brite et al. | 75—206 |
| 3,288,595 | 11/1966 | Reichard | 75—206X |

CARL D. QUARFORTH, Primary Examiner

GARY G. SOLYST, Assistant Examiner

U.S. Cl. X.R.

23—355; 75—84.1; 252—301.1; 264—.5